US006598282B2

(12) United States Patent
(10) Patent No.: US 6,598,282 B2
(45) Date of Patent: Jul. 29, 2003

Robles Gil-Bueno

(54) PROCESS FOR MANUFACTURING A WROUGHT TRIPLE-GLAZED STAINED-GLASS PANEL AND THE PRODUCT OBTAINED THEREOF

(76) Inventor: Pablo Robles Gil-Bueno, Francisco Villa No. 102, Col. San Pablo, C.P., Querétaro Qro (MX), 76130

( * ) Notice: Subject to any disclaimer, the term of this patent is extended or adjusted under 35 U.S.C. 154(b) by 106 days.

(21) Appl. No.: 09/953,918

(22) Filed: Sep. 18, 2001

(65) Prior Publication Data

US 2003/0051329 A1 Mar. 20, 2003

(51) Int. Cl.[7] .................................... B23P 19/04

(52) U.S. Cl. ......................... 29/455.1; 428/38; 52/456; 52/415; 52/306; 264/130; 264/246

(58) Field of Search ............................ 29/455.1, 460, 29/469, 469.5, 472.5, 472.7; 52/456, 415, 475, 306, 307; 264/130, 246, 278; 428/38

(56) References Cited

U.S. PATENT DOCUMENTS

| | | | | | |
|---|---|---|---|---|---|
| 3,676,920 | A | * | 7/1972 | Pilditch | 228/120 |
| 4,610,901 | A | * | 9/1986 | Linscott | 428/38 |
| 5,411,780 | A | * | 5/1995 | Kaefer | 428/38 |
| 5,418,021 | A | * | 5/1995 | Kim | 428/14 |
| 5,494,715 | A | * | 2/1996 | Glover | 428/34 |

* cited by examiner

*Primary Examiner*—Gregory Vidovich
*Assistant Examiner*—Stephen Kenny
(74) *Attorney, Agent, or Firm*—Rothwell, Figg, Ernst & Manbeck

(57) ABSTRACT

The present invention refers to a process for manufacturing a wrought triple-glazed stained-glass panel, in which are combining the single-glazed stained-glass panel techniques with the wrought-iron techniques for obtaining a final product with combined decorative and resistance features provided by the single-glazed stained-glass panel and the wrought-iron frame, respectively.

15 Claims, 5 Drawing Sheets

SECTION A-A'

PROCESS FOR MANUFACTURING A WROUGHT TRIPLE-GLAZED STAINED-GLASS PANEL AND THE PRODUCT OBTAINED THEREOF

FIELD OF THE INVENTION

The present invention refers to the techniques for manufacturing ornamental or decorative products, and more particularly, refers to a process for manufacturing a wrought triple-glazed stained-glass panel as well as the product obtained thereof.

BACKGROUND OF THE INVENTION

It is well known the use of single-glazed stained-glass panels as ornamental articles for decorating spaces on windows, doors, domes, etc., which are located on any kind of construction, such as houses, churches, museums, universities, bars and public buildings in general, among others.

It is also well know that a single-glazed stained-glass panel is the result of a process by means of which glass pieces of different color, size, shape and texture are joined by using a metal fuse, which is selected from the group consisting of lead, zinc, cooper and brass, more frequently using lead, and for this reason the single-glazed stained-glass panels were named “leaded panels”. Once the glass pieces are located into the fuse, like a puzzle, the joints of the fuse are welded for giving resistance to said single-glazed stained-glass panel.

From long time ago, the single-glazed stained-glass panels have been used on main entrance doors, either houses or buildings, providing special decorative characteristics to said doors. The single-glazed stained-glass panel can be located as central parts, sidelights and/or railings on the doors.

The method for manufacturing a single-glazed stained-glass panel for using in doors consists of the following steps:

① Once the design of the single-gazed stained-glass panel has been finished, the glass pieces are cut over said design, which shall have the color and texture desired;

② In case that the glass pieces be beveled, said glass pieces are submitted to a beveling process, in which the ends of the glass pieces are scabbled, thus forming an angle of light refraction. After this, the glass pieces are polished for eliminating the roughness produced by the beveling process. These steps are optional;

③ The glass pieces are positioned to form the selected design, like a puzzle;

④ For joining the glass pieces, a metallic fuse is located along every joint-ends of said glass pieces. The metallic fuse used is a grooved-shaped metal with the same length of the glass piece to join, in such manner that the joint-end of the glass pieces are positioned into the channel or groove of said metallic fuse. The metal of the fuse is selected from the group consisting of lead, zinc, cooper and brass;

⑤ The joints of the metallic fuses are soldered by means of the use of a Sn—Pb (Lead-Tin) brazing.

⑥ Finally, the single-glazed stained-glass panel is submitted to a cleaning process.

In consequence to the above, the single-glazed stained-glass panel has been finished.

Taking into account that in majority of the cases, one side of the single-glazed stained-glass panel is exposed to the weather, the joints of the fuses present pitting problems time after, and consequently, rainwater, wind or dust penetrate inward the constructions through said joints, due to the aforementioned problems.

In order to prevent the penetration problem, the single-glazed stained-glass panel manufacture techniques were enhanced, developing an insulating process, in which a triple-glazed stained-glass panel is formed starting from a single-glazed stained-glass panel.

Once the single-glazed stained-glass panel has been finished, it is submitted to the insulating process, which in general terms consisting of the following steps:

① A tempered glass having the same shape of the single-glazed stained-glass panel is arranged on both frontal and rear sides of said single-glazed stained-glass panel, forming a sandwich;

② A butyl paste is hot located around the perimeter of the above-formed sandwich for perfectly sealing the ends, thus forming the triple-glazed stained-glass panel.

With the employment of the tempered glasses on both frontal and rear sides of the single-glazed stained-glass panel, the metallic fuse is not directly in contact with the whether, thus avoiding the oxidation of said fuse, and in consequence, avoiding the pitting problems.

On the other hand, from long time ago the wrought iron techniques have been widely used for manufacturing doors and windows, which are subsequently located at the spaces previously destined for these purposes at houses and buildings.

Likewise, it is also known that the wrought iron techniques consists in forging the iron by means of the use a press for giving it special dimensions, features and shape, or by means of hand-forging, in, which the shape, features and dimensions are obtained based on hammer-stroke.

At the present time, the single-glazed stained-glass panels manufactured with the known techniques in the prior art can not be located on wrought-iron doors, due to the aforementioned penetration problems.

Such as we aforementioned, the fact that one side of the single-glazed is exposed to the weather, the rainwater, wind or dust can penetrate inward through the single-glazed stained-glass panel.

Notwithstanding the foregoing, at the present time there is no product described in prior art, which combines the ornamental features provided by the single-glazed stained glass panels with the resistance features provided by the wrought iron.

As a consequence from the above, there has been the need to avoid the drawbacks of the single-glazed stained-glass panels manufacturing techniques found in the state of the art, developing a process for manufacturing a wrought triple-glazed stained-glass panel as well as the product obtained thereof, which allows to obtain a product with combined ornamental and resistance features, and which can be used on any wrought-iron door.

OBJECTS OF THE INVENTION

Bearing in mind the drawbacks of the single-glazed stained-glass panel manufacturing techniques found in the state of the art, it is an object of the present invention to provide a process for manufacturing a wrought triple-glazed stained-glass panel, which allows to obtain a decorative product in a simple, easy and economical way.

Another object of the present invention is to provide a process for manufacturing a wrought triple-glazed stained-glass panel, which allows combine the single-glazed stained-glass panel manufacture techniques with the wrought-iron manufacture techniques for obtaining a product with special decorative characteristics.

An additional object of the present invention is to provide a wrought triple-glazed stained-glass panel, in which are combined the ornamental features of the single-glazed stained-glass panel with the resistance features of the wrought-iron products.

It is other object of the present invention to provide a wrought triple-glazed stained-glass panel, which can be located an any door.

BRIEF DESCRIPTION OF THE DRAWINGS

The above general objects as well as other and more specific objects of the invention will be fulfilled in the hereinbelow description and claims, taken in conjunction with the accompanying drawings, in which:

The FIG. 1 is a flow diagram in which are represented the different steps of a process for manufacturing a wrought triple-glazed stained-glass panel, in accordance with a preferred embodiment of the present invention.

Figure 2:
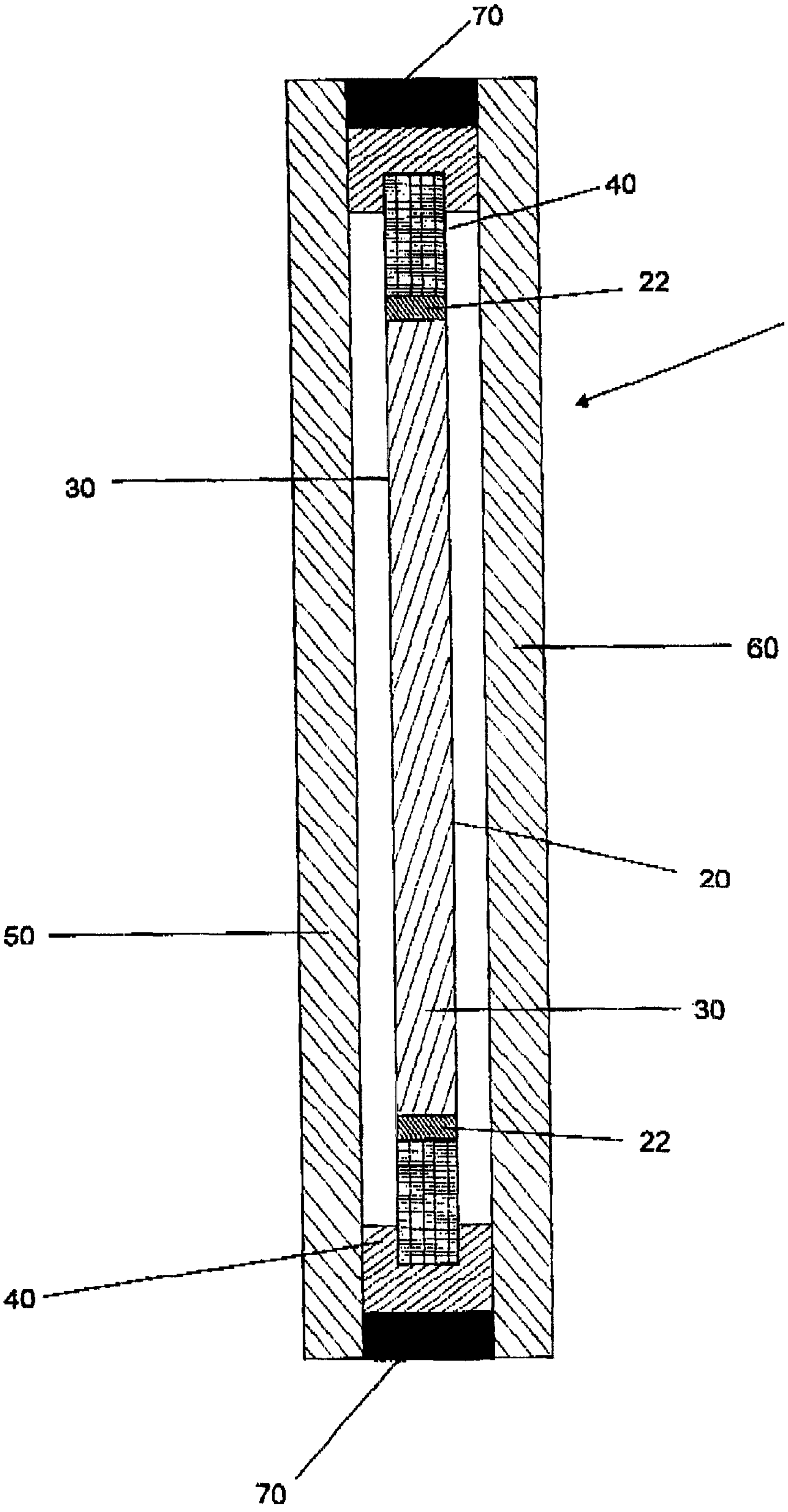
Figure 3:
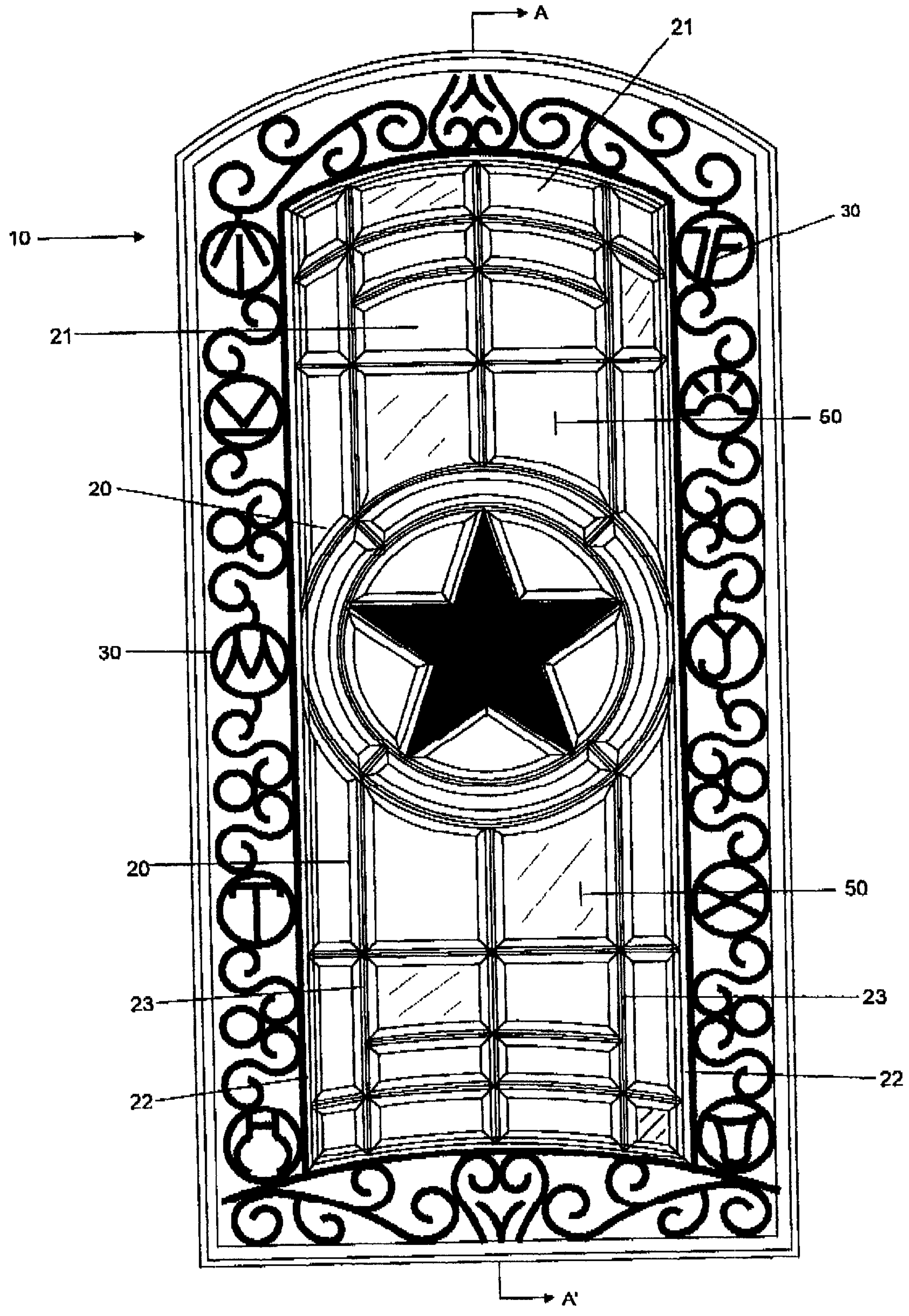

The FIG. 2 is cross-sectional view, taken along the section A–A' of FIG. 3, of a wrought triple-glazed stained-glass panel manufactured in accordance with the process of the preferred embodiment of the present invention.

The FIG. 3 is a front elevational view of a wrought triple-glazed stained-glass panel used as central part on doors, manufactured in accordance whit the process of the present invention.

Figure 4:
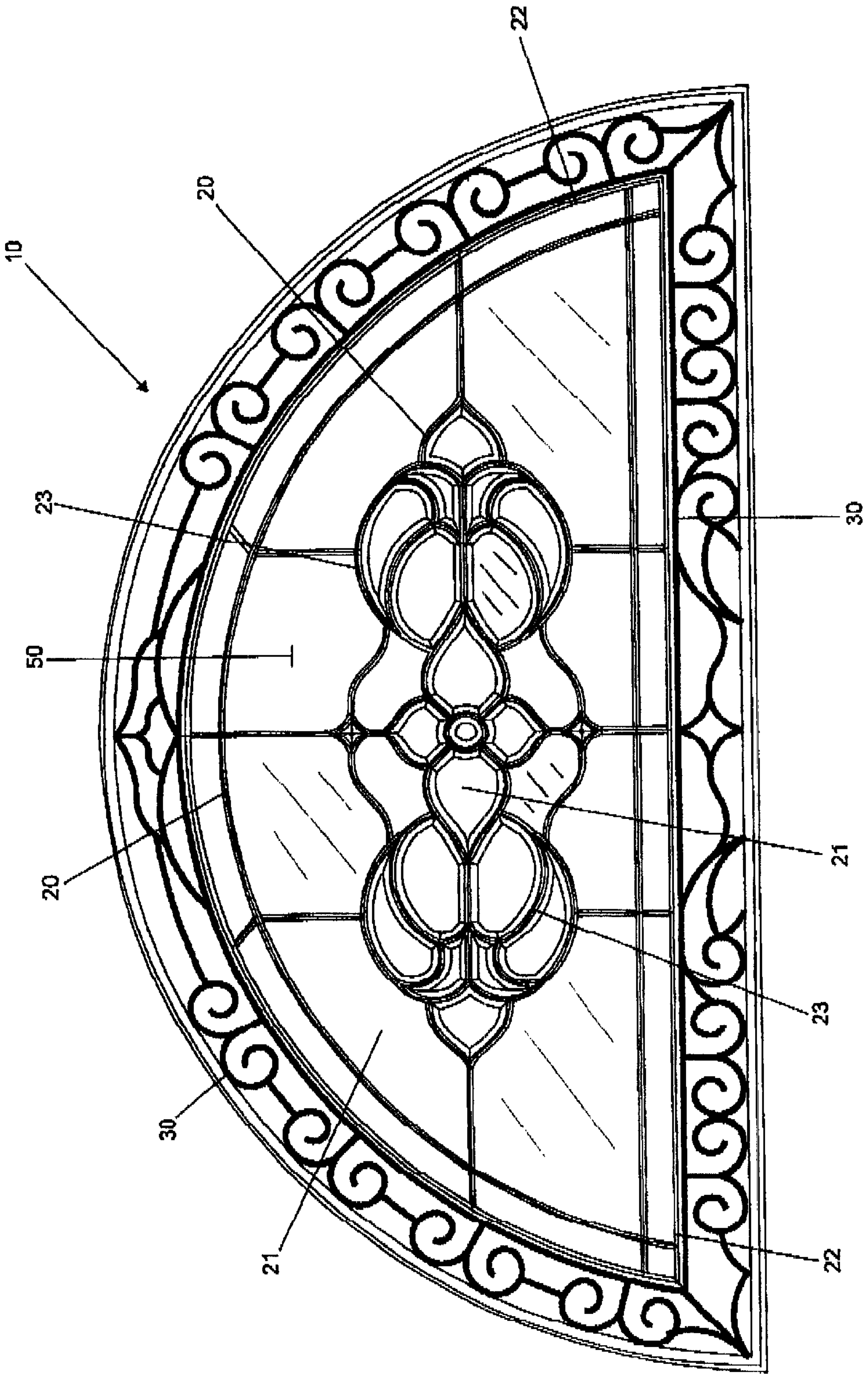

The FIG. 4 is a front elevational view of a wrought triple-glazed stained-glass panel used as transom on doors, manufactured in accordance whit the process of the present invention.

Figure 5:
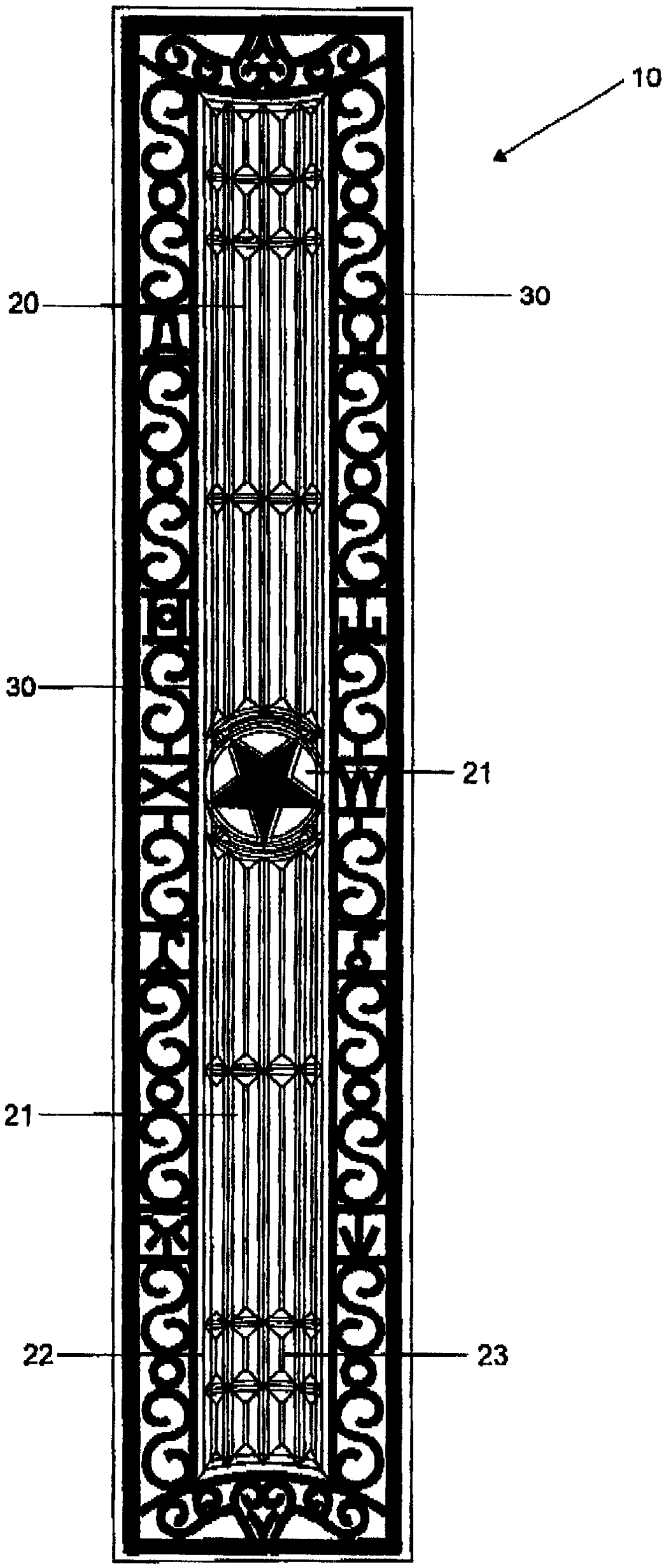

The FIG. 5 is a front elevational view of a wrought triple-glazed stained-glass panel used as side-light on doors, manufactured in accordance whit the process of the present invention.

DETAILED DESCRIPTION OF THE INVENTION

It has gotten developed a process for manufacturing a wrought triple-glazed stained-glass panel, in which are combining the single-glazed stained-glass panel with the wrought-iron manufacture techniques.

The incorporation of the single-glazed stained-glass panel on a wrought frame allows the likelihood of obtaining a final product of excellent quality, which has no problems of penetration of rainwater, dust or wind inward the constructions.

There are many advantages of the present invention over the prior art. The preferred embodiment of the invention allows the replacement of the doors made from either metallic or non-metallic material. Furthermore, the wrought triple-glazed stained-glass panel of the present invention including ornamental and decorative aspects provided by the single-glazed stained-glass panels.

Figure 1:
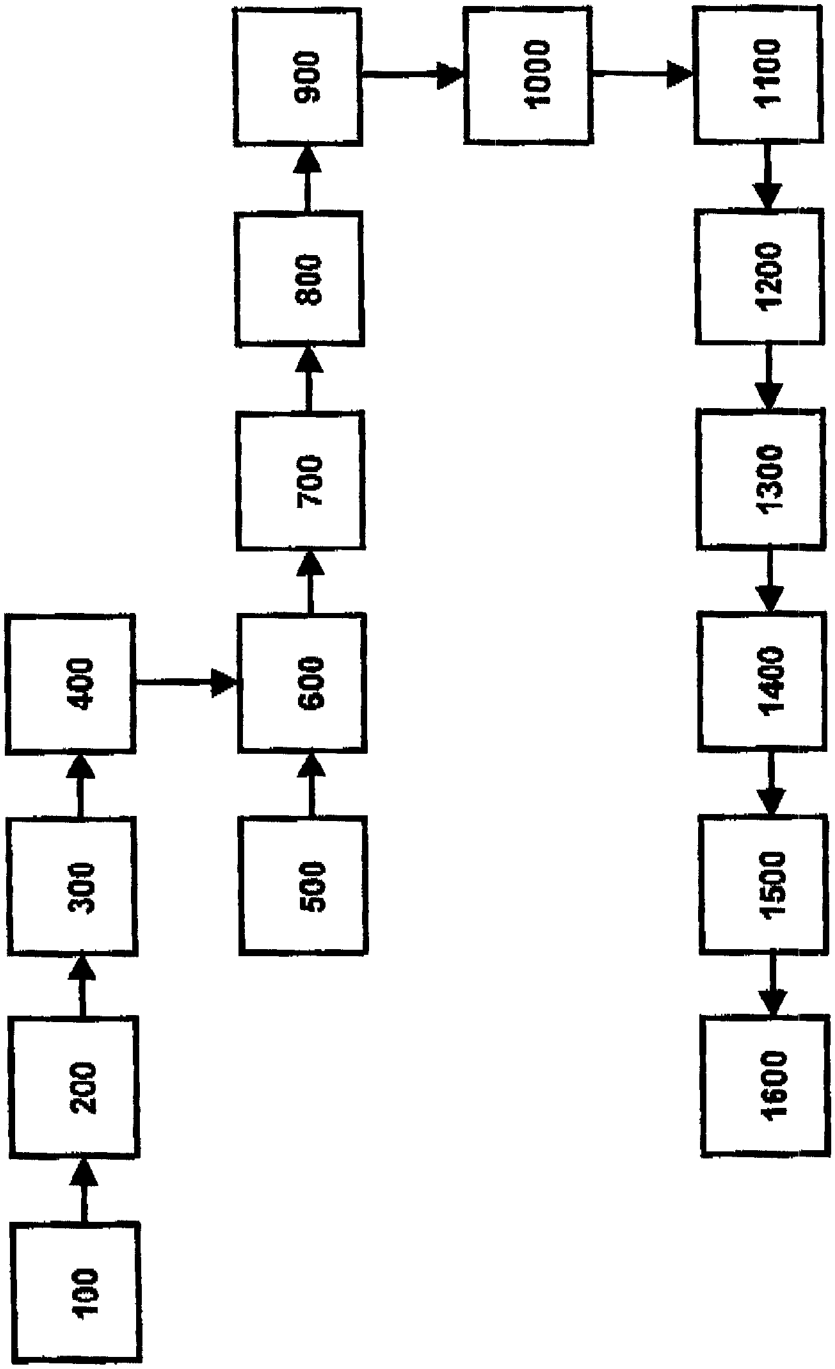

Now then, referring to the accompanying drawings, and more particularly, to the FIG. 1, there is illustrated a flow diagram, in which are diagrammatically represented the steps to carry out the process for manufacturing a wrought triple-glazed stained-glass panel 10, in accordance with a preferred embodiment of the present invention. The process consisting of the following steps:

a) Elaboration 100 of a design of the desired single-glazed stained glass panel 20 using a computer program. Once the single-glazed stained-glass panel 20 has been designed, it is full size printed on a paper. For every glass pieces 21 that going to form part of the single-glazed stained-glass panel 20, a template is made to facilitate the cut of said glass pieces 21. The template is made in an acrylic material;

b) Cut step 200 of the glass pieces 21 are cut either using a pantograph or manually, depending on the panels 10 to manufacture. These glass pieces 21 having the desired color and texture;

c) Beveled process 300 of the glass pieces 211 in which the ends of the glass pieces 21 are scabbled, thus forming an angle of light refraction. In order to carry out the beveled, the glass pieces 21 must have a thickness of at least 3-mm (0.118");

d) Polished step 400 of the glass pieces 21 for eliminating the roughness produced by the beveling process. In an additional embodiment, the frontal and rear faces of the glass pieces 21 can be completely planes;

e) Manufacture 500 of a first frame 30 with the wrought-iron techniques known in the prior art, wherein the wrought-iron frame 30 is based at a pre-established design, therefore, the different bar pieces 31 to form the frame 30 are cut, bent and welded according to the pre-established design. Special devices are used to bend the bar pieces 31. The wrought-iron frame 30 being of any regular shape and size and the material for manufacturing thereof is a wrought-iron bar;

f) Manufacture 600 of a second frame 22 according to the single-glazed stained-glass panel design, therefore, the shape and size of said second frame 22 depend of said panel design. The second frame is manufactured in brass material;

g) Assembling 700 of the glass pieces 21 obtained in step (c) into a second frame 22, like a puzzle, positioning said second frame 22 into the wrought-iron frame 30 obtained in the prior step, wherein the second frame 22 is approximately smaller than the first frame 30;

h) To join 800 the glass pieces 21, using a metallic fuse 23 which is located along every joint-ends of said glass pieces 21. The metallic fuse 23 used is a grooved-shaped metal with the same length of the glass piece 21 to join, in such manner that the joint-end of the glass pieces 21 are positioned into the channel or groove of said metallic fuse 23. The metal of the fuse 23 is selected from the group consisting of lead, zinc, cooper and brass, preferably using a metallic fuse of zinc, preferably using zinc;

i) Soldered step 900 of the joints of the metallic fuses 23, using a Sn—Pb (Lead-Tin) brazing, in order to provide resistance to the joints of the single-glazed stained-glass panel 20 formed into the wrought-ron frame 30. Likewise, the joints of said single-glazed stained-glass panel 20 with the wrought-iron frame 30, are soldered using Sn—Pb brazing;

j) Washed 1000 of the wrought single-glazed stained-glass panel for eliminating impurities;

k) Standardization 1100 of the color of the wrought single-glazed stained-glass panel, in which the wrought-iron frame 30 is painted with black paint. Meanwhile, the single-glazed stained-glass panel 20 is submitted to a chemistry process using a commercial liquid product named "patina" made on the basis of selenious acid, which is an oxidizing agent, therefore, said selenious acid oxidizes the superficial face of the metal fuse 23 taking a black color, very similar to the color of the wrought-iron frame 30;

l) To rinse 1200 the wrought single-glazed stained glass panel for eliminating chemical remainders;

m) Sealed step 1300 with silicone of the apertures formed between the single-glazed stained-glass panel 20 and the wrought-iron frame 30;

n) Insulated process 1400 of the wrought single-glazed stained-glass panel, by using a strip 40, whose commercial name is "Super Spacer" and which includes a centrally located channel 41 at full length, said strip 40 being located around the ends of the wrought single-glazed stained-glass panel, for which, said wrought single-glazed stained-glass panel is positioned into the channel 41 of the strip 40. Furthermore, the strip 40 includes an aluminum strip covering an adhesive layer, located on its frontal 42 and rear 43 faces, respectively;

o) To arrange 1500 a first tempered glass 50 having the same shape and size of the wrought single-glazed stained-glass panel on frontal side of the single-glazed stained-glass panel 20 and a second tempered glass 60 having the same shape and size of the wrought single-glazed stained-glass panel on the rear face of said wrought single-glazed stained-glass panel, forming a sandwich. For joining the tempered glasses 50 and 60 to the single-glazed stained-glass panel 20, the aluminum strip is separated from the channeled strip 40, leaving exposed the adhesive and, manually making a little pressure over the sandwich, said tempered glasses 50 and 60 are joined to the wrought single-glazed stained-glass panel, on condition that the impurities and humidity had been eliminated into the sandwich, and in consequence, the wrought triple glazed stained-glass panel 10 has been formed; and p) Sealed step 1600 of the wrought triple-glazed stained-glass panel, by using a butyl paste 70 in hot condition, said paste is located around the perimeter of said wrought triple-glazed-stained-glass panel.

Referring now to the FIG. 2, there is illustrated in a cross-sectional view, taken along the line A–A', of a wrought triple-glazed stained-glass panel 10, manufactured in accordance with the preferred embodiment of the process of the present invention.

The wrought triple-glazed stained-glass panel 10 of the present invention can be manufactured on any shape and size, depending on the place in which will be located on the doors, since said wrought triple-glazed stained-glass panel 10 can be located on central part, side-lights and/or transom of the door.

The wrought triple-glazed stained-glass panel 10 in general terms comprising: the single-glazed stained-glass panel 20; the wrought-iron frame 30, which serves as housing of the single-glazed stained-glass panel 20; the channeled strip 40 located around the perimeter of the wrought triple-glazed stained-glass panel 10; a first tempered glass 50 located on the frontal side of said wrought triple-glazed stained-glass panel 10; a second nonshatettering glass 60 located on the rear side of said wrought triple-glazed stained-glass panel 10, and, a butyl paste 70 immediately located after the strip 40, for sealing the wrought triple-glazed stained-glass panel 10.

The single-glazed stained-glass panel 20 can be manufactured in any shape and size and, such as it has been discussed along this specification, the single-glazed stained-glass panel 20 used for obtaining the wrought triple-glazed stained-glass 10 of the present invention, is obtained by using the process known in the prior art, which basically comprising the steps of cutting the glass pieces 21, wherein said glasses 21 can be of any color, shape and texture; subsequently, said glass pieces 21 are located over the desired design, and also locating the ends of the glass pieces into the channel or groove of the metal fuse 23, wherein the metal of the fuse 23 is selected from lead, zinc, brass and cooper, among others, preferably using zinc; and finally, the joints of the metal fuse 23 are soldered by using a Sn—Pb brazing.

Similarly, the wrought frame 30 is separately manufactured using the wrought-iron techniques described in the prior art. The shape and size of the wrought-iron frame 30 depends on the use or place in which will be located the panel 10 on the door.

The channeled strip 40 is a commercial butyl strip, including a channel or groove 41, which is located along of said strip 40. The channel 41 serves to facilitate the position of the wrought single-glazed stained-glass panel.

The tempered glasses 50 and 60 having the same shape and size of the wrought-iron frame 30, being of a thickness of at least 3-mm (0.118").

Due to the great variety of shapes and designs of the single-glazed stained-glass panel 20, in a similar way, a great number of wrought triple-glazed stained-glass panel 10 can be obtained. According to the foregoing, the wrought triple-glazed stained-glass panel 10 can be located on the main entrance doors, either located as central part, sidelight and/or transom.

Referring now to FIG. 3, there is illustrated a front view of one example of the multiple shapes of wrought triple-glazed stained-glass panel 10 that can be obtained. Specifically, the FIG. 2 shows a wrought triple-glazed stained-glass 10, which is located on central part of the doors.

Referring now to FIG. 4, there is illustrated a front view of another example of the wrought triple-glazed stained-glass panel 10 of the present invention, which is located on the transom of the doors.

Referring now to FIG. 5, there is illustrated a front view of an additional example of the wrought triple-glazed stained-glass panel 10 of the present invention, which is located on sidelight of the doors.

As it can be seen from the above, the process may be performed in a simple, easy and economical manner, permitting the obtainment of a wrought triple-glazed stained-glass panel of excellent quality, since it is combining the ornamental features of the single-glazed and resistance features of the wrought iron.

Although preferred embodiments of the present invention are described, it will be understood by those skilled in the art that variations may be made without departing from the spirit of the invention or the scope of the appended claims.

What is claimed is:

1. A process for manufacturing a wrought triple-glazed stained-glass panel, comprising the following steps:

a) elaborating a design of the desired single-glazed stained-glass panel using a computer program;

b) cutting the corresponding glass pieces, which have the desired color and texture;

c) beveling the glass pieces obtained in the prior step, scabbling the ends of said glass pieces, thus forming an angle of light refraction;

d) polishing the glass pieces for eliminating the roughness produced by the beveling process of the prior step;

e) manufacturing a first frame according to a pre-established design, by cutting, bending and welding wrought-iron material pieces which form part of said first frame;

f) manufacturing a second frame according to the single-glazed stained-glass panel design, wherein the shape and size of said second frame depend of said panel design;

g) assembling the glass pieces obtained in step (c) into a second frame, positioning said second frame into the first frame obtained in the prior step;

h) joining the glass pieces by using a fuse, which is located along every joint-ends of said glass pieces;

i) soldering the joints of the fuses, in order to provide resistance to said joints;

likewise, the second frame is soldered to the first frame in several points around the joint perimeter, so as to affixing the second frame to the first frame, thus obtaining a single-glazed stained-glass panel;

j) washing the single-glazed stained-glass panel obtained in prior step;

k) standardizing the color of both first and second frames as well as the fuse;

l) rinsing the single-glazed stained-glass for eliminating impurities;

m) sealing with silicon the apertures formed between the first frame and the second frame;

n) locating a strip around the perimeter of the single-glazed stained-glass panel, in order to prepare said single-glazed stained-glass panel for an insulating process, said strip including on both frontal and rear faces an aluminum strip which covers a layer adhesive;

o) insulating the single-glaze stained-glass, arranging on both frontal and rear sides of said single-glazed stained-glass panel a tempered glass, which have the same shape and size of the single-glazed stained-glass panel, forming a sandwich; and p) sealing perfectly the ends of the sandwich of the prior step, thus obtaining the wrought triple-glazed stained-glass panel of the present invention.

2. A process for manufacturing a wrought triple-glazed stained-glass panel, according to claim 1, wherein the glass pieces are cut by means of a pantograph.

3. A process for manufacturing a wrought triple-glazed stained-glass panel, according to claim 1, wherein the glass pieces are manually cut.

4. A process for manufacturing a wrought triple-glazed stained-glass panel, according to claim 1, wherein the glass pieces are completely planes on both frontal and rear faces.

5. A process for manufacturing a wrought triple-glazed stained-glass panel, according to claim 1, wherein the first frame has any regular shape and size, according to the pre-established design and is manufactured in wrought-iron material.

6. A process for manufacturing a wrought triple-glazed stained-glass panel, according to claim 1, wherein the second frame has the same size and shape of the originally designed single-glazed stained-glass panel and is manufactured in brass material.

7. A process for manufacturing a wrought triple-glazed stained-glass panel, according to claim 6, wherein the second frame is approximately smaller than the first frame.

8. A process for manufacturing a wrought triple-glazed stained-glass panel, according to claim 1, wherein the fuse is a shaped-metal that includes a centrally located channel or groove, said fuse being of the same length of the glass piece to join, in such manner that the joint-end of said glass piece is positioned into the groove of said fuse for assembling the single-glazed stained-glass panel.

9. A process for manufacturing a wrought triple-glazed stained-glass panel, according to claim 8, wherein the material of the fuse is selected from the group consisting of lead, zinc, brass and cooper.

10. A process for manufacturing a wrought triple-glazed stained-glass panel, according to claim 9, wherein the material of the fuse is zinc.

11. A process for manufacturing a wrought triple-glazed stained-glass panel, according to claim 1, wherein the standardization of the color consisting in:

firstly, to paint the first frame with black paint; and, subsequently, to submit the single-glazed stained-glass to a chemical process of superficial oxidizing by using an oxidizing agent, in which the second frame and the fuse acquire a black color, very similar to the color of the first frame.

12. A process for manufacturing a wrought triple-glazed stained-glass panel, according to claim 11, wherein the oxidizing agent is on the basis of a selenious acid solution.

13. A process for manufacturing a wrought triple-glazed stained-glass panel, according to claim 1, wherein the strip used in the insulating process has a channel centrally located at full length, into which the ends of the single-glazed stained-glass panel are positioned.

14. A process for manufacturing a wrought triple-glazed stained-glass panel, according to claim 1, wherein the tempered glasses are joined to the single-glazed stained-glass panel using the adhesive layer included on the channeled strip, for which, the aluminum strip is removed from said channeled strip, leaving exposed the adhesive layer, and then, manually making a little pressure over the sandwich so as to assure the tempered glasses stay perfectly joined to the single-glazed stained-glass panel.

15. A process for manufacturing a wrought triple-glazed stained-glass panel, according to claim 1, wherein the sealed of the ends of the wrought triple-glazed stained-glass panel is carried out by using a butyl paste in hot condition.

* * * * *